United States Patent
Kim et al.

(10) Patent No.: US 9,860,741 B2
(45) Date of Patent: Jan. 2, 2018

(54) ENVIRONMENTAL CONFIGURATION FOR IMPROVING WIRELESS COMMUNICATION PERFORMANCE

(71) Applicant: Samsung Electronics Co., Ltd., Gyeonggi-do (KR)

(72) Inventors: Jongheon Kim, Gyeonggi-do (KR); Cheehwan Yang, Gyeonggi-do (KR); Jangsun Yoo, Seoul (KR); Junghwan Park, Chungcheongbuk-do (KR)

(73) Assignee: Samsung Electronics Co., Ltd., Samsung-ro, Yeongton-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/972,509

(22) Filed: Dec. 17, 2015

(65) Prior Publication Data

US 2016/0183141 A1 Jun. 23, 2016

(30) Foreign Application Priority Data

Dec. 18, 2014 (KR) .................. 10-2014-0183546

(51) Int. Cl.
*H04W 24/00* (2009.01)
*H04W 8/22* (2009.01)

(52) U.S. Cl.
CPC .................................... *H04W 8/22* (2013.01)

(58) Field of Classification Search
CPC ..... H04L 43/16; H04L 65/80; H04L 41/5025; H04L 12/1407; H04L 43/0894; H04L 41/0631; H04L 43/0811; H04N 21/6131; H04N 21/2402; H04N 21/6125; H04N 21/2343; H04N 21/4312; H04N 21/6405; H04N 21/6473; H04N 21/6547; H04W 4/001; H04W 28/0226; H04W 28/0284; H04W 28/16; H04W 24/00

See application file for complete search history.

(56) References Cited

U.S. PATENT DOCUMENTS

| | | | |
|---|---|---|---|
| 2006/0274750 A1* | 12/2006 | Babbar ................. | H04L 45/306 370/390 |
| 2007/0103836 A1* | 5/2007 | Oh ........................ | G06F 1/3203 361/115 |
| 2008/0188206 A1* | 8/2008 | Pirzada ................. | H04W 24/02 455/414.1 |
| 2010/0191861 A1* | 7/2010 | Cheng ................... | H04L 5/0007 709/232 |
| 2014/0177752 A1 | 6/2014 | Kesling et al. | |

* cited by examiner

*Primary Examiner* — Quan M Hua
(74) *Attorney, Agent, or Firm* — Cha & Reiter, LLC

(57) ABSTRACT

An electronic device and method are disclosed. The electronic device includes a wireless communication unit that performs wireless communication, a display unit, and at least one processor, which implements the method, including in response to detecting a request to enter a wireless communication maximization mode, controlling the display unit to display an option for configuring the wireless communication maximization mode, detecting a selection input to the option, and changing a configuration of at least one component of the electronic device to reduce noise from the at least one component generated in a wireless communication frequency band according to the selected option.

13 Claims, 7 Drawing Sheets

ENVIRONMENTAL CONFIGURATION FOR IMPROVING WIRELESS COMMUNICATION PERFORMANCE

CLAIM OF PRIORITY

This application claims priority from and the benefit under 35 U.S.C. §119(a) of Korean Patent Application No. 10-2014-0183546, filed on Dec. 18, 2014, which is hereby incorporated by reference for all purposes as if fully set forth herein.

TECHNICAL FIELD

The present disclosure relates to a method for improving wireless communication performance by changing the environment configuration of an electronic device and the electronic device implementing the same.

BACKGROUND

The development of communication technologies enables an electronic device to perform various types of wireless communication, such as wireless communication between wireless communication systems or wireless communication between an electronic device and another electronic device. The speed of a wireless communication is increasing with the continued development of the communication technologies. Not only is the speed of communication getting higher, but also the range of a communication area covered for facilitating communication is expanding. The development of the communication technologies is also accompanied by the development of the electronic device using the communication technologies. In using wireless communication, the performance of the electronic device leveraging communication technology itself is an important factor, which has evolved with the continued development of communication technologies. The electronic device may have optimal configuration conditions which are configured to perform faster wireless communication with other electronic devices on the basis of the developed communication technologies. The electronic device may generally have optimal configuration values which are determined on the basis of the state of the use of wireless communication.

SUMMARY

In relation to a factor having an effect on wireless communication, an optimal value at the time of an electronic device development may be applied to the electronic device. Generally speaking, a user is typically restricted in terms of their ability to adjust the optimal value applied to the electronic device. Hence, it may be difficult to change the preset configuration of an electronic device in response to the frequent change in the state of the communication by the electronic device. For example, when using Wi-Fi, an electronic device may be not able to perform wireless communication if there is an obstacle between an Access Point (AP) and the electronic device or interference in a corresponding channel. It is beneficial to maximize the wireless communication performance of the electronic device so that the electronic device can perform the wireless communication even when a transmission/reception signal is weak. Although the transmission/reception signal is weak owing to external factors, it is beneficial for the electronic device to be able to change the environment configuration thereof so as to enable and/or maximize wireless communication performance.

In one aspect of the present disclosure, an electronic device is disclosed, including a wireless communication unit that performs wireless communication, a display unit, and at least one processor. The processor is configured to: in response to detecting a request to enter a wireless communication maximization mode, control the display unit to display an option for configuring the wireless communication maximization mode, detect a selection input to the option, and change a configuration of at least one component of the electronic device to reduce noise from the at least one component generated in a wireless communication frequency band according to the selected option.

In another aspect of the present disclosure, a method for improving wireless communication performance in an electronic device is disclosed, including: in response to detecting a request for entering a wireless communication maximization mode, displaying an option for configuring the wireless communication maximization mode, detecting a selection input to the option, and changing, by at least one processor, a configuration of at least one component of the electronic device to reduce noise from the at least one component generated in a wireless communication frequency band in response to the selected option.

BRIEF DESCRIPTION OF THE DRAWINGS

The present disclosure will be more apparent from the following detailed description in conjunction with the accompanying drawings, in which.

DETAILED DESCRIPTION

Figure 1:
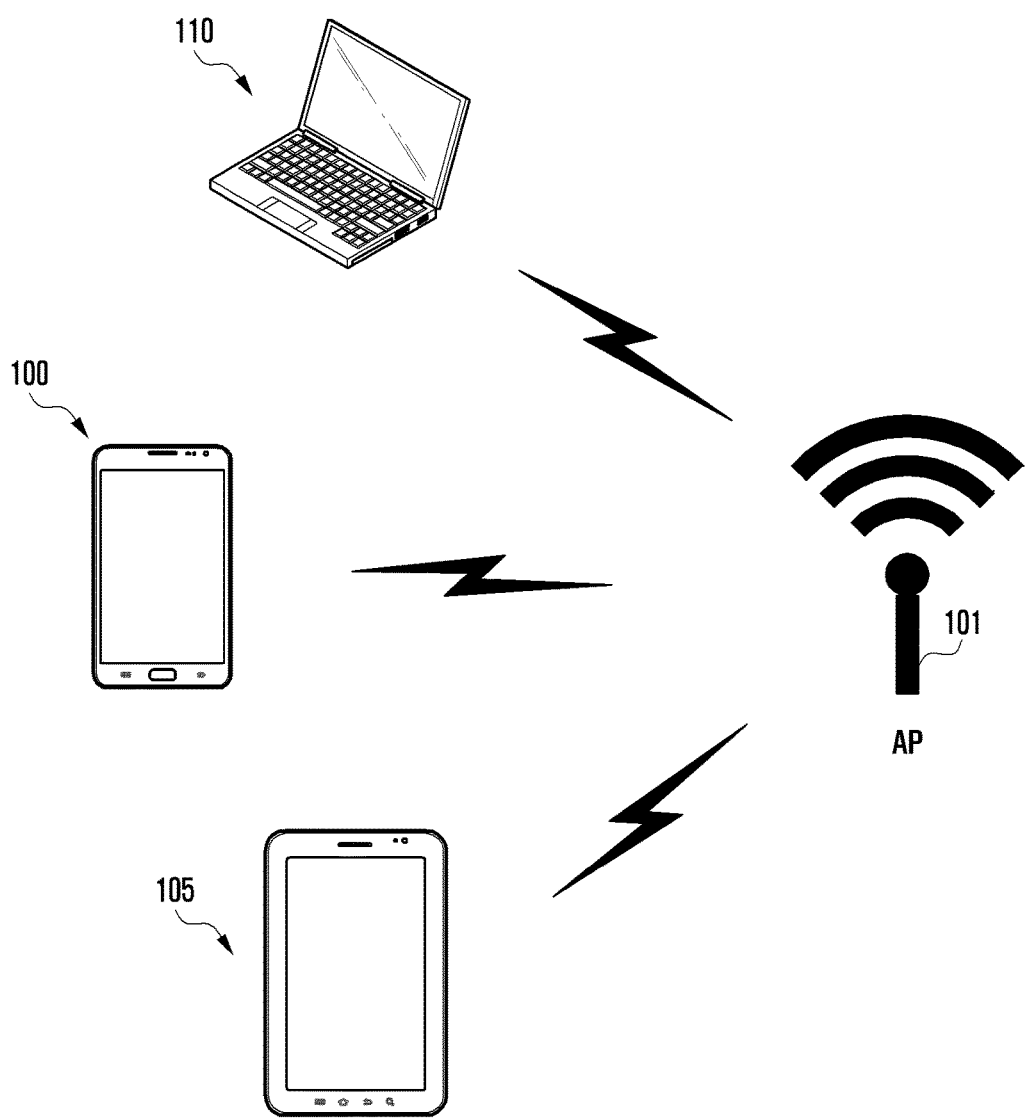
FIG. 1 illustrates a schematic diagram in which an electronic device according to various embodies of the present disclosure is provided with a wireless communication network service.

Example embodiments of the present disclosure are described with reference to the accompanying drawings in detail. Various changes may be made to the disclosure, and the disclosure may have various forms, such that example embodiments will be illustrated in the drawings and described in detail. However, such an embodiment is not intended to limit the disclosure to the disclosed example embodiment and it should be understood that the embodiment include all changes, equivalents, and substitutes within the disclosure. Throughout the drawings, like reference numerals refer to like components.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is obvious that the components should not be defined by these terms. For example, the terms do not restrict the order and/or importance of the corresponding components. The terms are used for distinguishing one component from another component. For example, a first component may be referred to as a second component and likewise, a second component may also be referred to as a first component, without departing from the teaching of the inventive concept.

The wording "a wireless communication maximization mode", used in various embodiments means a mode in which the environment configuration of an electronic device has been changed so that the electronic device can, more rapidly, receive and process data and a signal, which are received through a wireless communication network. The electronic device simultaneously processes various works, and thus can allocate resources in response to the various works. "The wireless communication maximization mode" may be a mode in which the environment configuration of an electronic device has been changed so as to enable the electronic device to mainly perform wireless communication. In other words, "the wireless communication maximization mode" can control the functions of some or all configuration units so that the resources allocated to "a wireless communication unit" can be maximized. The electronic device environment configuration, which will be changed according to "the wireless communication maximization mode", may already have been designated by a developer, and some or all configuration units and functions of the electronic device may have been designated.

The terminology used herein is for the purpose of describing particular embodiments and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. head-mounted device (HMD) such as electronic glasses, electronic clothing, electronic bracelet, electronic necklace, electronic appcessory, electronic tattoo, smart-watch, etc.

Descriptions are made of the electronic devices according to various embodiments with reference to accompanying drawings hereinafter. The term 'user' used in various embodiments may denote a person or a device (e.g. artificial intelligent electronic device) using the electronic device.

FIG. 1 illustrates a schematic diagram in which an electronic device according to various embodies of the present disclosure is provided with a wireless communication network service.

Referring to FIG. 1, an electronic device (e.g. a smart phone, a tablet PC, a laptop) 100 can be connected to a wireless communication network to use a wireless communication service. FIG. 1 illustrates a Wi-Fi service among wireless communication services but is not limited thereto. Further, the electronic device 100 may include or be implemented as any appropriate electronic devices capable of using the wireless communication service. In addition to the smart phone (e.g., electronic device 100), a tablet PC 105 and the laptop 110 are also illustrated in FIG. 1 as an example.

Wi-Fi is a local area network (LAN) in which a high-speed internet service can be used within a predetermined distance from a place at which an Access Point (AP) 101 is installed. Specifically, in 1997, "IEEE 802.11" was announced as the first standard of a standardized wireless LAN and the brand-name of this "IEEE 802.11" is "wireless fidelity", i.e. Wi-Fi. Most wireless LAN devices abide by a Wi-Fi standard, and thus it is also recognized that "Wi-Fi equals a wireless LAN." The Wi-Fi is classified into an infrastructure mode and an ad hoc mode according to the kind of device or a use mode. The infrastructure mode enables data to be transmitted to and received from multiple electronic devices which are located within a predetermined distance from the AP 101, and the "ad-hoc" mode enables electronic devices to transmit and receive data to and from each other in a P2P form without an Access Point. The infrastructure mode is a common Wi-Fi use mode and Wi-Fi mentioned below will be described on the basis of the infrastructure mode. Wi-Fi basically corresponds to a wireless LAN employing a short range network scheme and may thus have a service area limited on the basis of an AP. Although there may be a difference according to the performance of the AP 101, the AP 101 may generally have a service area of 20-30 meters in the case of a product for home use and a service area of 100-200 meters in the case of a product for company use. Generally, the farther the electronic device 100 is away from the AP 101, the slower the speed of wireless communication available to the electronic device 100, and if the electronic device 100 is outside the service area, the electronic device 100 may be disconnected from the AP 101 entirely. Further, although the electronic device 100 is located at a point near to the AP 101, the speed of wireless communication by the electronic device 100 may be decrease according to the location of or obstruction from a surrounding structure, or the current configuration state and work state of the electronic device 100. When the electronic device 100 uses a Wi-Fi service, the speed of wireless communication by the electronic device 100 may vary according to the current configuration state and work state of the electronic device 100 in addition to the distance from the AP 101. Herein, "the current configuration state and work state" of the electronic device 100 may mean the state of the electronic device 100, where consideration is given to functions, executed by the electronic device 100, such as an activation state of Bluetooth communication, the clock-speed of on-board memory, the activation state of a "roaming" function, and the activation state of a battery power-saving function.

Figure 2:
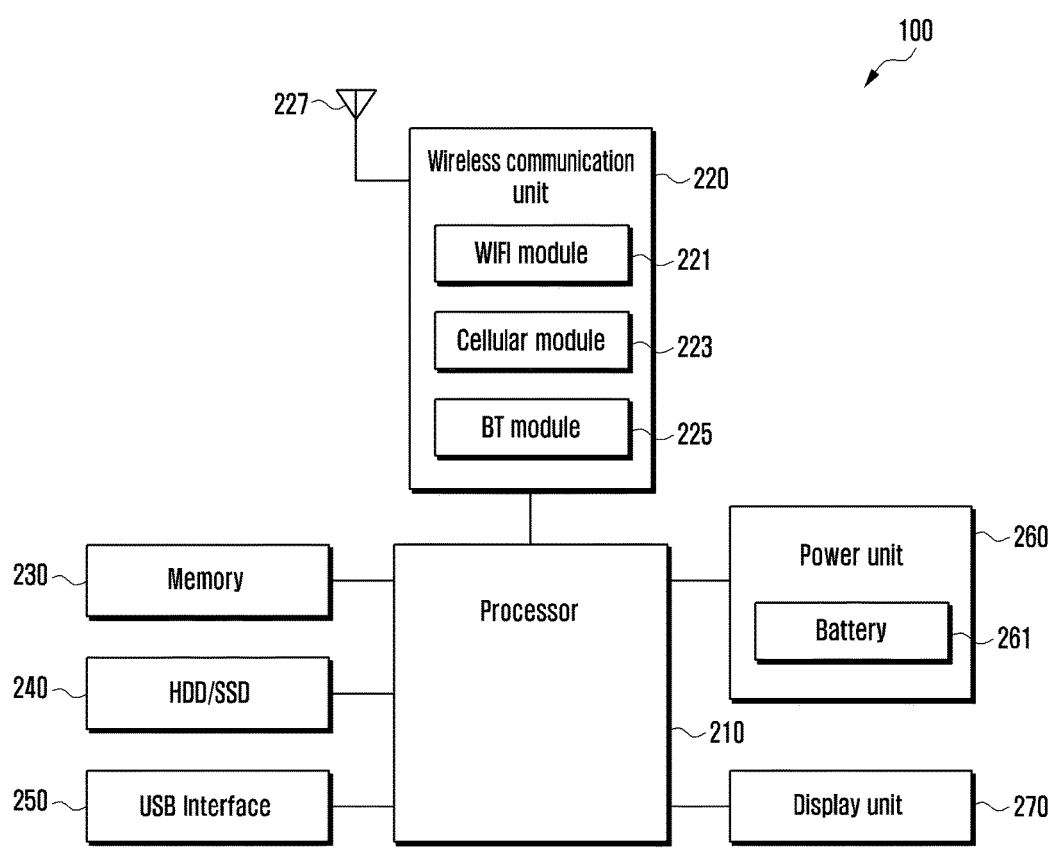
FIG. 2 illustrates a block diagram of an electronic device according to various embodiments of the present disclosure.

FIG. 2 illustrates a block diagram of an electronic device according to various embodiments of the present disclosure.

Referring to FIG. 2, the electronic device 100 may include a processor 210, a wireless communication unit 220, a memory 230, an HDD/SSD 240, a USB interface 250, a power unit 260, and a display unit 270. Although not illustrated, the configuration units described above are connected to each other by a bus, and the processor 210 can transfer a signal (i.e. a control message) to the configuration units to control the configuration units.

The processor 210 can generally control overall operations of the electronic device 100. For example, the processor 210 can receive a command from the above-mentioned other units (e.g. the wireless communication unit 220, the memory 230, HDD/SSD 240, the USB interface 250, and the power unit 260) through the bus, decode the received command, and process calculations or data according to the decoded command. Further, although not illustrated, a Communication Processor (CP) for performing wireless communication may be included in the processor 210. The CP is separately embedded in the electronic device 100 to enable the electronic device 100 to be provided with a wireless communication service under the control of the processor 210. When using a wireless communication service through the wireless communication unit 220, the processor 210 of the electronic device 100 according to an embodiment of the present disclosure can control the configuration units of the electronic device 100 so that the wireless communication service can be maximized and used. In addition, the processor 210 of the electronic device 100 of another embodiment of the present disclosure can control some or all configuration units of the electronic device in response to the connection state of a wireless communication service.

The wireless communication unit 220 may include at least one element which enables wireless communication between wireless communication networks or wireless communication between the electronic device 100 and another electronic device. The wireless communication unit 220 may include a Wi-Fi module 221, a cellular module 223, and a Bluetooth (BT) module 225. Although not illustrated, the wireless communication unit 220 may include additional modules, such as a GPS module and a NFC module, which are capable of performing a wireless communication. The wireless communication unit 220 according to various embodiments of the present disclosure enables the electronic device 100 to use the wireless communication service (e.g. Wi-Fi) through an Access Point. Specifically, the wireless communication unit 220 can scan wireless communication networks to which the electronic device 100 can be connected and then connect the electronic device 100 to a discovered wireless communication network.

The Wi-Fi module 221 enables the electronic device 100 to use a wireless communication service by using a method for transmitting an electric wave or infrared light within a predetermined distance from the Access Point (AP). In other words, the processor 210 can wirelessly communicate with the AP on the basis of the Wi-Fi module 221. Also, the Wi-Fi module 221 can search for a surrounding AP. Further, the Wi-Fi module 221 can transfer, to the processor 210, information on the speed of data transmission/reception using a Wi-Fi service.

The cellular module 223 may provide a voice call, a video call, a message service, or an internet service through a communication network (for example, LTE, LTE-A, CDMA, WCDMA, UMTS, WiBro, GSM, etc.). The cellular module 223 may include a Communication Processor (CP) and may be implemented by SoC (System on Chip). When the wireless communication network connection through the Wi-Fi module 221 has been cut off, the cellular module 223 can continuously search for a surrounding communication network and be connected to a surrounding communication network, thereby enabling the electronic device 100 to wirelessly communicate with the communication network.

The BT module 225 can be connected to another electronic device therearound to transmit/receive data. The BT module 225 can be mainly used when performing a wireless connection by low power in the very short range of about 10 meters. If the BT module 225 is included in both a main device which attempts a connection and an auxiliary device connected to the main device, the main device and the auxiliary device can wirelessly communicate with each other. When a Bluetooth function is used through the BT module 225, the processor 210 according to the present disclosure can use the same antenna, which is shared with Wi-Fi, while using the same frequency band as the Wi-Fi. Therefore, the processor 210 may cause the decrease of wireless communication performance due to a noise generated by the simultaneous use of the Wi-Fi and the BT function.

The memory 230, which is a configuration unit embedded in a computer, may be a memory semiconductor that is located between a Central Processing Unit (CPU) and a hard disk (e.g. a Hard Disk Drive (HDD), a Solid State Drive (SSD)) which is an auxiliary memory device, the memory semiconductor enabling the reduction of a bottleneck phenomenon caused by a difference in the hard disk speed. In other words, the memory 230 may include a Random Access Memory (RAM). The memory 230 can transmit/receive data between the hard disk and the CPU and the performance of the memory 230 can be checked on the basis of the clock of the memory 230. For example, a memory of which the clock is 1,600 MHz may be a memory that is faster than a memory of which the clock is 1,333 MHz and has higher performance than the latter. The more the memory clock increases, the more the performance of the electronic device is improved. However, noise generated by the electronic device 100 may grow louder in response to the increased memory clock.

The HDD/SSD 240 may be included in a hard disk which is an auxiliary memory device and can record and store data. An HDD is a kind of hard disk, and can read and store data while rotating a magnetic disc. The HDD should physically rotate the magnetic disc, and there may thus be a limit to a rotational speed. Also, if the rotational speed of the magnetic disc is accelerated, noise or power consumption may be increased rapidly. Therefore, a Solid State Drive (SSD) may be used as an alternative to the HDD. Unlike the HDD, the SSD has a semiconductor memory embedded therein, instead of a magnetic disc. Since the SSD operates on the basis of the semiconductor memory, the SSD can read and write data at a speed higher than that of the HDD. Further, since the SSD has no components which are physically moved, no noise is caused by an operation thereof and power consumption may also be low. The SSD may include a SATA-type interface and a flash memory. The HDD/SSD 240 according to the present disclosure may be an SSD type, and operate on the basis of the SATA-type interface. For example, the HDD/SSD 240 can be driven in SATA 2 type or SATA 3 type, and the SATA 3 type is driven at a higher speed than the SATA 2 type.

The USB interface 250 may be an interface corresponding to one among connection types for a peripheral device which is connected to the electronic device 100. The USB interface 250 may include interfaces of upgraded versions, such as USB 1.0, USB 2.0, and USB 3.0, according to the development of technical power. For example, the USB 3.0 has a fast data transmission speed of maximum of 5 Gbps and has a power supply capability of 900 mA for supplying power from the port, enhanced from 500 mA of USB2.0. Therefore, the USB 3.0 enables a peripheral device, which needs high power, to operate without separate external power. The USB interface 250 uses the same shaped port regardless of version, and can operate even when different versions of devices are connected to each other. However, in the case of the different versions of devices, the USB interface 250 may operate on the basis of an earlier version of devices. The processor 210 according to the present disclosure may randomly change the version of the USB interface 250.

The power unit 260 can supply power to the electronic device 100 so that the processor 210 performs a function of the electronic device 100. The power unit 260 may include the battery 261 and, although not illustrated, may also include a power management integrated circuit (PMIC) and a charger integrated circuit (charger IC). The PMIC may use a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, etc.) for wireless charging may be further included. The power unit 260 may supply power to the electronic device 100 and the supplied power may vary according to the capacity of the battery 261 included in the power unit 260. For example, when the remaining capacity of the battery 261 is under the predetermined reference value, the power unit 260 may lower power supplied to the electronic device 100. Further, since the processor 210 operates the configuration units of the electronic device 100 by low power, the configuration units may not exhibit 100% of the performance thereof.

The display unit 270 can display all kinds of information (e.g. multimedia data or text data) related to a function which is performed by the electronic device 100. The display unit 270 according the present disclosure can display an option window which can be selected by a user and can also display a notification message in response to the user's selection. The display unit 270 can be formed of a Liquid Crystal Display (hereinafter, referred to as "LCD") and can also become an input means when the LCD is formed in a Touch Screen form. In particular, the display unit 270 can receive a touch input by the user and display a function corresponding to the touch input by the user.

Figure 3:
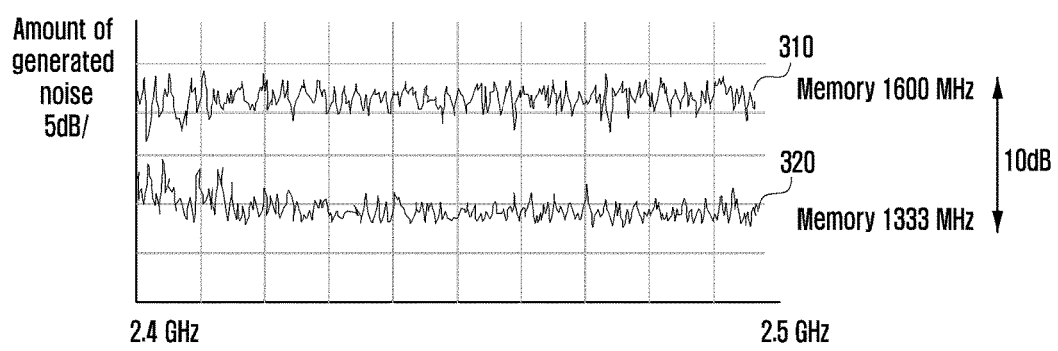
FIG. 3 is a graph for describing the amount of noise generated on the basis of a memory clock according to various embodiments of the present disclosure.

FIG. 3 is a graph describing the amount of noise generated on the basis of a memory clock according to various embodiments of the present disclosure.

Referring to FIG. 3, the electronic device 100 may generate a different amount of noise according to the clock-speed of memory 230. For example, the electronic device 100 can generate noise on the basis of the clock-speed of the memory 230 being set at a communication frequency of 2.4 GHz-2.5 GHz, which may correspond to Wi-Fi. A first noise 310 line in the graph may indicate the amount of noise generated when the clock of the memory 230 is 1,600 MHz. A second noise 320 line in the graph may indicate the amount of noise generated when the clock of the memory 230 is 1,333 MHz. Further, as seen in the graph illustrated in FIG. 3, the horizontal axis indicates the Wi-Fi communication frequency range of 2.4 GHz to 2.5 GHz and the vertical axis indicates the amount of generated noise. One scale of the axis of ordinate corresponds to 5 dB of generated noise. The 5 dB of generated noise corresponding to one scale is a relative comparison value, and the graph illustrated in FIG. 3 shows a relative comparison between the first noise 310 and the second noise 320. The electronic device 100 according to the present disclosure can emit about 10 dB less noise when operating 1,333 MHz memory 230 compared to the operation of 1,600 MHz memory 230. The processor 210 of the electronic device 100 according to the present disclosure can control the memory 230 to change the clock-speed from 1,600 MHz 1,333 MHz, and can thereby achieve roughly 10 dB of noise reduction based on the changed clock-speed of the memory 230.

Figure 4:
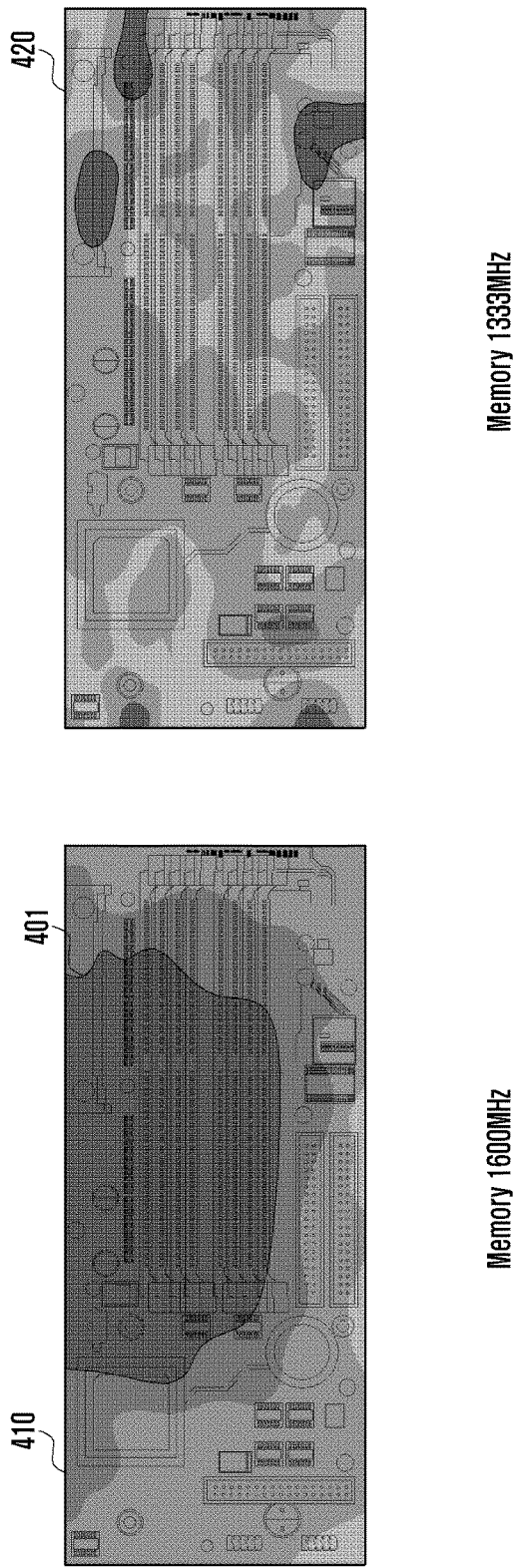
FIG. 4 is an example view for describing the intensity of noise generated on the basis of a memory clock according to various embodiments of the present disclosure, and the effect of the noise on the surroundings.

FIG. 4 is an example view for describing the intensity of noise generated on the basis of a memory clock according to various embodiments of the present disclosure, and the effect of the noise on the peripheral areas.

Referring to FIG. 4, FIG. 4 shows a comparison between noise generated when the clock of the memory 230 is 1,600 MHz and noise generated when the clock of the memory 230 is 1,333 MHz, in terms of the intensity of the noises and the effect of the noises on the surroundings. Images 410 and 420 illustrated in FIG. 4 may be example images taken by measuring the circuit board of the electronic device 100 by a noise scanner. Herein, the noise scanner may be a noise measurement device for displaying noise, which is generated by the electronic device 100, using a color, thereby enabling the noise to be seen with the naked eye. Image 410 illustrates noise generated on a circuit board when to the 1,600 MHz memory 230 is used, and Image 420 illustrates noise generated on a circuit board when the 1300 MHz memory 230 is used. Compared with Image 420, Image 410 illustrates a dark area 401 wider than the Image 420. In other words, the intensity and amount of noise, which is generated according to the clock of the memory 230 used in the electronic device 100, may vary, and the electronic device 100 can generate more noise when operating the 1,600 MHz memory relative to the 1,333 MHz memory. The increase of the intensity and amount of noise generated by the electronic device 100 may influence the performance of an electronic component embedded therein. In other words, when the electronic device 100 operates the 1,600 MHz memory, more noise is generated than when the electronic device 100 operates the 1,333 MHz memory and thus the performance (e.g., such as wireless communication performance) of the electronic device 100 may be degraded in some proportion to the noise.

Figure 5:
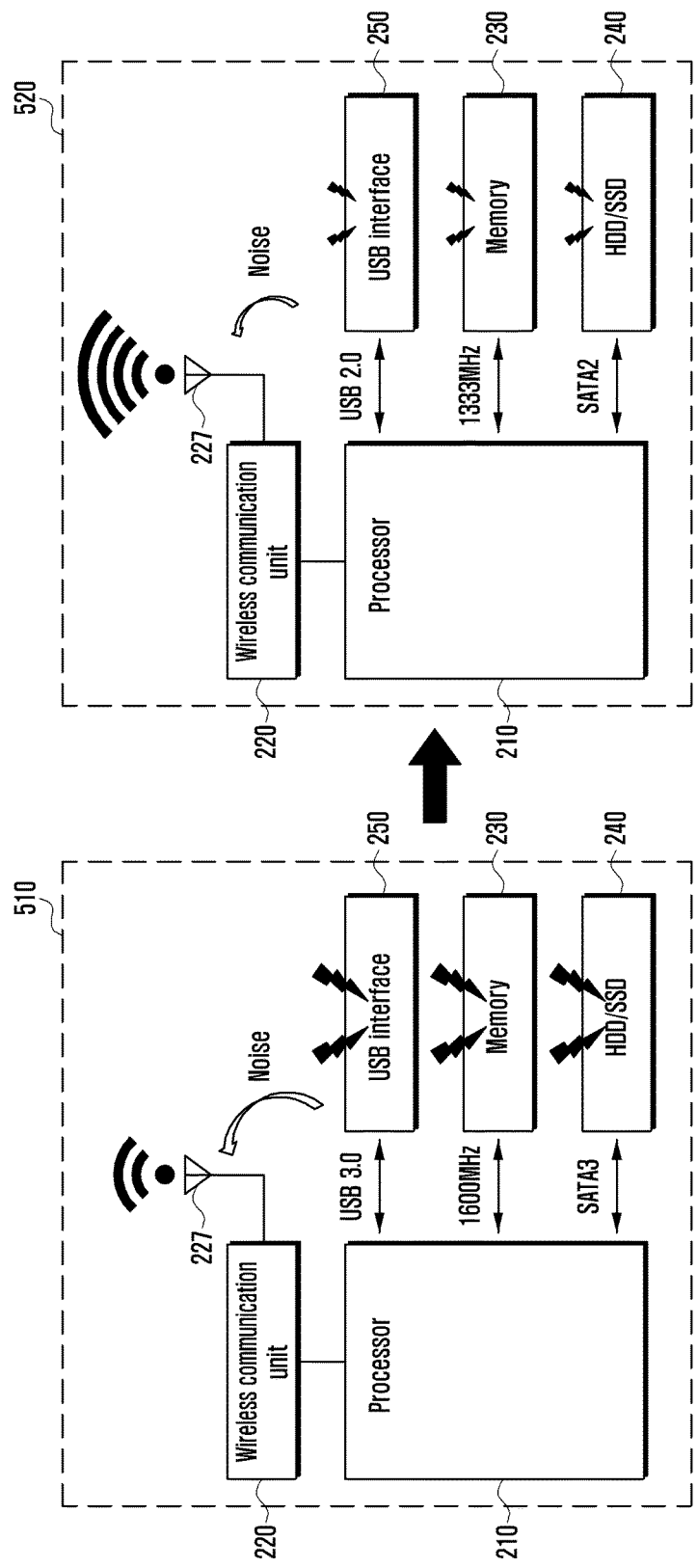
FIG. 5 is an example view for describing that wireless communication performance has been improved on the basis of the change of the configuration of an electronic device according to various embodiments of the present disclosure.

FIG. 5 is an example view illustrating an improvement in wireless communication performance has been improved on the basis of the change of the configuration of an electronic device according to various embodiments of the present disclosure.

Referring to FIG. 5, FIG. 5 separately illustrates an electronic device in a first configuration state 510 and an electronic device in a second configuration state 520. Herein, the electronic device in the first configuration state 510 and the electronic device in the second configuration state 520 may represent the same electronic device 100, as illustrated FIG. 1 and FIG. 2, and now differing merely with regards to their respective configuration states. Further, a processor 210, a wireless communication unit 220, a memory 230, an HDD/SSD 240, and a USB interface 250, which are illustrate in both the first configuration state 510 and the second configuration state 520, may be the same configuration units as the configuration units of the electronic device 100, illustrated in FIG. 2.

The electronic device in the first configuration state 510 may be in a configuration state in which the clock-speed of memory 230 is 1,600 MHz, the type of the HDD/SSD 240 interface is a "SATA 3" type, and the version of the USB interface 250 is "USB 3.0." Specifically, the processor 210 in the first configuration state 510 may operate or configure the various components in accordance with the configuration, such that the memory 230 operates at a clock-speed of 1,600 MHz, the hard-drive operates as a SATA 3-type HDD/SSD 240, and the USB interface 250 operates under USB 3.0 protocols. In the first configuration state 510 described above, the processor 210 can use Wi-Fi through an antenna 227 of the wireless communication unit 220. Here, a frequency band corresponding to the Wi-Fi may be 2.4 GHz, and the above-mentioned memory 230, HDD/SSD 240, and/or the USB interface 250 may generate noise in the 2.4 GHz band. Thus, under the first configuration state 510, Wi-Fi performance may be degraded by the effect of noise generated in response to the configuration state for the configuration units of the electronic device 100.

In contrast, consider the electronic device in the second configuration state 520. In the second configuration state 520, the clock-speed of the memory 230 is 1,333 MHz, the type of the HDD/SSD 240 interface is SATA 2, and the version of the USB interface 250 is USB 2.0. Specifically, the processor 210 in the second configuration state 520 may thus operate or otherwise configure the components such that memory 230 operates at a clock-speed of 1,333 MHz, the hard-drive operates as a SATA 2-type HDD/SSD 240, and the USB interface 250 operates under USB 2.0 protocols. As in the first configuration state 510, the processor 210 in the second configuration state 520 operates Wi-Fi through the antenna 227 of the wireless communication unit 220. A frequency band corresponding to the Wi-Fi may be 2.4 GHz, and the above-mentioned memory 230, HDD/SSD 240, and USB interface 250 may generate noise in the 2.4 GHz band. However, compared with noise generated in the first configuration state 510, noise generated in the second configuration state 520 is reduced. Referring to the example views illustrated in FIG. 3 and FIG. 4, the electronic device in the second configuration state may generate less and/or lower noise compared to operation of the electronic device in the first configuration state 510. Since the amount of noise generated by the electronic device in the second configuration state 520 is reduced relative to that of noise generated by the electronic device in the first configuration state 510, the electronic device in the second configuration state 520 may operate Wi-Fi with improved performance, relative to the operation of Wi-Fi while executing the first configuration state 510.

An electronic device according to various embodiments of the present disclosure can maximize a wireless communication service by changing the configuration of configuration units by software. In other words, the electronic device can maximize wireless communication by controlling some or all configuration units which have an effect on receiving the wireless communication service. For example, the electronic device may have a preset configuration in which the memory clock-speed is 1,600 MHz, the type of HDD/SSD is SATA 3, and the version of USB Interface is USB 3.0. The configuration of the configuration units may not be changed by a user. Further, when the electronic device uses Wi-Fi, the performance of the Wi-Fi may be decreased due to the above-mentioned memory, HDD/SSD, and USB interface. When the above-mentioned memory, HDD/SSD, and USB interface are operated, noise may generate in 2.4 GHz band corresponding to the Wi-Fi. In particular, the more the performance of the above-mentioned memory, HDD/SSD, and USB interface is improved, the more the intensity and amount of generated noise may increase. Therefore, when the electronic device uses Wi-Fi, the Wi-Fi performance of the electronic device may be degraded by the effect of the increased noise. When the intensity of a Wi-Fi signal is high because there is an AP within a short range, the noise may have a very small effect on the electronic device. However, when the intensity of the Wi-Fi signal is weak, Wi-Fi performance may be significantly degraded according to the effect of the noise. When the Wi-Fi signal intensity is weak, the electronic device according to various embodiments of the present disclosure can change the configuration of the configuration units, which impede the use of Wi-Fi by the electronic device, thereby maximizing electronic device performance executing communication over Wi-Fi. In addition to an operation of controlling the configuration units which have a bad effect on performing wireless communication, other functions unrelated to wireless communication by the electronic device may also be controlled, and thereby resources devoted to the wireless communication may be maximized. In other words, the electronic device can control the configuration units to be specialized for wireless communication by maximizing the resources devoted to the wireless communication.

Figure 6:
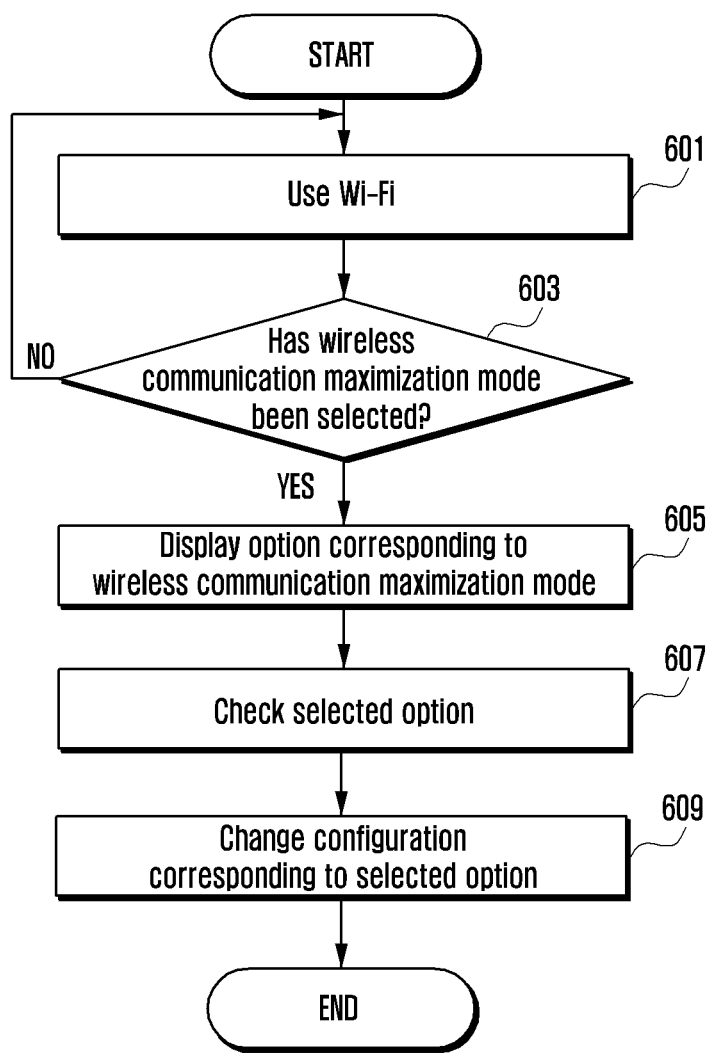
FIG. 6 is a flowchart for describing a method for manually improving a wireless communication performance by a user according to an embodiment of the present disclosure.

FIG. 6 is a flowchart for describing a method for manually improving a wireless communication performance by a user according to an embodiment of the present disclosure.

Referring to FIG. 6, in operation 601, the processor 210 of the electronic device 100 may activate, operate or otherwise use Wi-Fi. For example, the processor 210 of the electronic device 100 may operate Wi-Fi communication to connect to a Wi-Fi enabled network.

In operation 603, the processor 210 can determine whether "a wireless communication maximization mode" has been selected. A user may observe or intuit a need to activate "the wireless communication maximization mode" while using Wi-Fi through the electronic device 100. For example, when buffering of media occurs as a result of the deterioration of wireless reception by wireless communication, particularly when a large quantity of data such as multi-media, video or image data is being downloaded, the user may attempt to change the mode of the electronic device to "the wireless communication maximization mode" to optimize wireless communication. In other words, in operation 603, the processor 210 of the electronic device 100 can detect the input by the user who attempts to enter "the wireless communication maximization mode," thereby determining whether "the wireless communication maximization mode" has been selected. Herein, "the wireless communication maximization mode" may be a particular mode which enables the electronic device 100 to perform wireless communication with at least improved performance when the electronic device 100 performs wireless communication (e.g. Wi-Fi). Further, "the wireless communication maximization mode" can be set by using particular software installed in the electronic device 100. Although not illustrated, the processor 210 can generate or cause a display to display warning messages according to various options in the process of changing the configuration to "the wireless communication maximization mode." For example, when the configuration is changed to "the wireless communication maximization mode," the processor 210 can transfer warning messages, such as a message that the performance of a system may be decreased, a message that an additional function cannot be used, and a message that the system should be rebooted.

When "the wireless communication maximization mode" is selected in operation 603, the processor 210 can display an option corresponding to "the wireless communication maximization mode" in operation 605. Herein, examples of the option corresponding to "the wireless communication maximization mode" may include a limit on the convenient function of wireless communication (e.g. a limit on a Roaming function, a limit on a Back Scan function), a limit on the system function (e.g. the release of a battery power saving function, a limit on a Bluetooth function), the change of a method for operating an electronic device (e.g. the change of memory clock, the change of the SATA speed of the HDD/SSD, or the change of the version of a USB interface).

Specifically, the limit on the convenient function of wireless communication may limit the Roaming function and the Back Scan function. The processor 210 may be executing the Roaming function to facilitate wireless communication function other than the Wi-Fi connection. The Roaming function distributes and/or dissipates resources which the processor 210 can allocate, and thereby Wi-Fi-based wireless communication may not be maximized. Therefore, the processor 210 can limit the Roaming function, thereby maximizing the Wi-Fi-based wireless communication. In addition, the processor 210 may be continuously performing the Back Scan function. Herein, the Back Scan function may be a function wherein the processor 210 performs a to periodic or real-time scan of network services which enable communication. If the electronic device 100 leaves the service area of a particular Wi-Fi and the particular Wi-Fi connection is released, the processor 210 may perform a periodic or real-time scan of surrounding network services, thereby enabling the electronic device 100 to connect to an available Wi-Fi provider, other than the particular Wi-Fi to which it has just been disconnected, or a network service, other than Wi-Fi, capable of performing wireless communication. This Back Scan function can also distribute and/or dissipate the resources which can be allocated by the processor 210. Therefore, the processor 210 can limit the Back Scan function, thereby maximizing the Wi-Fi-based wireless communication. In order to apply the above-mentioned limit on the convenient function of the wireless communication, the corresponding driver should be reset. Hence, the processor 210 can give a user advance notice of the resetting of the driver. Two examples of the limit on the convenient function of the wireless communication are described above, but they are not all.

In addition, the limit on the system function may include release of a battery power saving function or limiting of the Bluetooth function. The electronic device 100, which is driven by using the battery 261, can usually perform the battery power saving function. The electronic device 100 may perform a battery power saving function in order to operate the electronic device for a longer time on the basis of a limited amount of a battery. For example, when the remaining amount of a charged battery drops below the preset threshold value, the processor 210 of the electronic device 100 can execute the battery power saving function to extend operational life of the electronic device 100. When the battery power saving function has been performed, the processor 210 may reduce the amount of power which is allocated to the configuration units, in order to ration the power of the battery 261. Therefore, the configuration units may not be operating at a maximum performance level for operations which can be performed by the configuration units. The electronic device 100 according to the present disclosure can release the battery power saving function in order to maximize the Wi-Fi-based wireless communication. By releasing the battery power saving function, the processor 210 can control the electronic device to perform wireless communication with the maximum performance (although typically for a short time, instead of operating the electronic device for a long time with the battery power saving function). Also, the processor 210 can limit the Bluetooth function. The processor 210 can usually use an antenna in order to perform the Bluetooth function. In other words, the processor 210 according to the present disclosure can perform two functions by using the antenna when using the Bluetooth simultaneously with the Wi-Fi-based wireless communication. The processor 210 can limit the Bluetooth function in order to maximize the Wi-Fi-based wireless communication, and can control the configuration units so as to allow Wi-Fi to exclusively use the antenna, thereby maximizing the Wi-Fi-based wireless communication. Since the above-mentioned limit on the system function can be set under an operating system, it is unnecessary to reboot the electronic device 100. Although examples of imposing or lifting operational limitations on system functions of the electronic device are described above, this description is not meant to be comprehensive and it is understood other types of optimizations may exist.

Further, the change of a method for operating the electronic device may include changing of memory clock-speed, changing of the SATA speed of HDD/SSD, and changing the version of USB interface. The processor 210 can change the clock-speed of the memory 230, thereby moving the generation band of noise which has a bad effect on Wi-Fi-based wireless communication. The description about FIG. 3 and FIG. 4 shows that the intensity and amount of noise generated by the electronic device 100 in the 2.4 GHz band is associated with the clock of the memory 230. For example, when the clock of the memory 230 is changed from 1,600 MHz to 1,333 MHz, noise generated by the electronic device 100 may be decreased. Therefore, the processor 210 can change the clock of the memory 230 from 1,600 MHz to 1,333 MHz, thereby moving noise generated in the 2.4 GHz band into another band. The decrease of noise generation in the 2.4 GHz enables the processor 210 to maximize the Wi-Fi-based wireless communication. Further, the processor 210 can change the SATA speed of HDD/SSD, thereby moving noise generated in the 2.4 GHz band into another band. Specifically, the Wi-Fi-based wireless communication may greatly be affected by the SATA speed of HDD/SSD. For example, the type of HDD/SSD interface has become SATA 3 after being SATA 2 and the speed of data transmission has become higher. As the speed of data transmission becomes higher, the speed of data transmission has a larger effect on the Wi-Fi-based wireless communication. As a result, the processor 210 can change the type of HDD/SSD interface from SATA 3 to SATA 2, thereby maximizing the Wi-Fi-based wireless communication. Further, the processor 210 can change the USB interface version, thereby reducing noise generated in the 2.4 GHz band. Specifically, the processor 210 can change the configuration to divert the recognition as USB 3.0 to the recognition as USB 2.0, thereby reducing noise generated by electronic device 100.

The change of a method for operating a memory, mentioned above, involves the clock of the memory 230 being changed, and thus a reset may be performed. The processor 210 can notify, in advance, a user of the resetting to be performed before the resetting of a system. Three examples of the method for reducing noise generated in the 2.4 GHz band are described above, but they are not all.

The option corresponding to the wireless communication maximization mode displayed in operation 605 may include examples mentioned above. A method according to the present disclosure is to programmatically control electronic device 100, and thus options corresponding to the wireless communication maximization mode may be preset by a developer. The options may include some or all of the above-mentioned various examples and may be packaged and preset by the developer. For example, the packaged options may include options corresponding to a limit on the convenient function of wireless communication (e.g. a limit on a Roaming function, a limit on a Back Scan function). The options corresponding to the wireless communication maximization mode may also be configured by packaging options such as "the release of a battery power saving function" and "the change of memory clock". The packaged options may include operations which do not cause any problem in the normal operation of the electronic device 100.

In operation 607, the processor 210 can detect an option that is selected by a user. Although not illustrated, the user can select one of options corresponding to the wireless communication maximization mode displayed in operation 605. Further, in operation 607, the processor 210 can detect the user's selection and display a check mark indicating the selected option.

Further, in operation 609, the processor 210 can change the configuration corresponding to the selected option. The option is an option which has already been packaged, and may include an operation which limits or changes the functions of some or all configuration units of electronic device 100.

Figure 7:
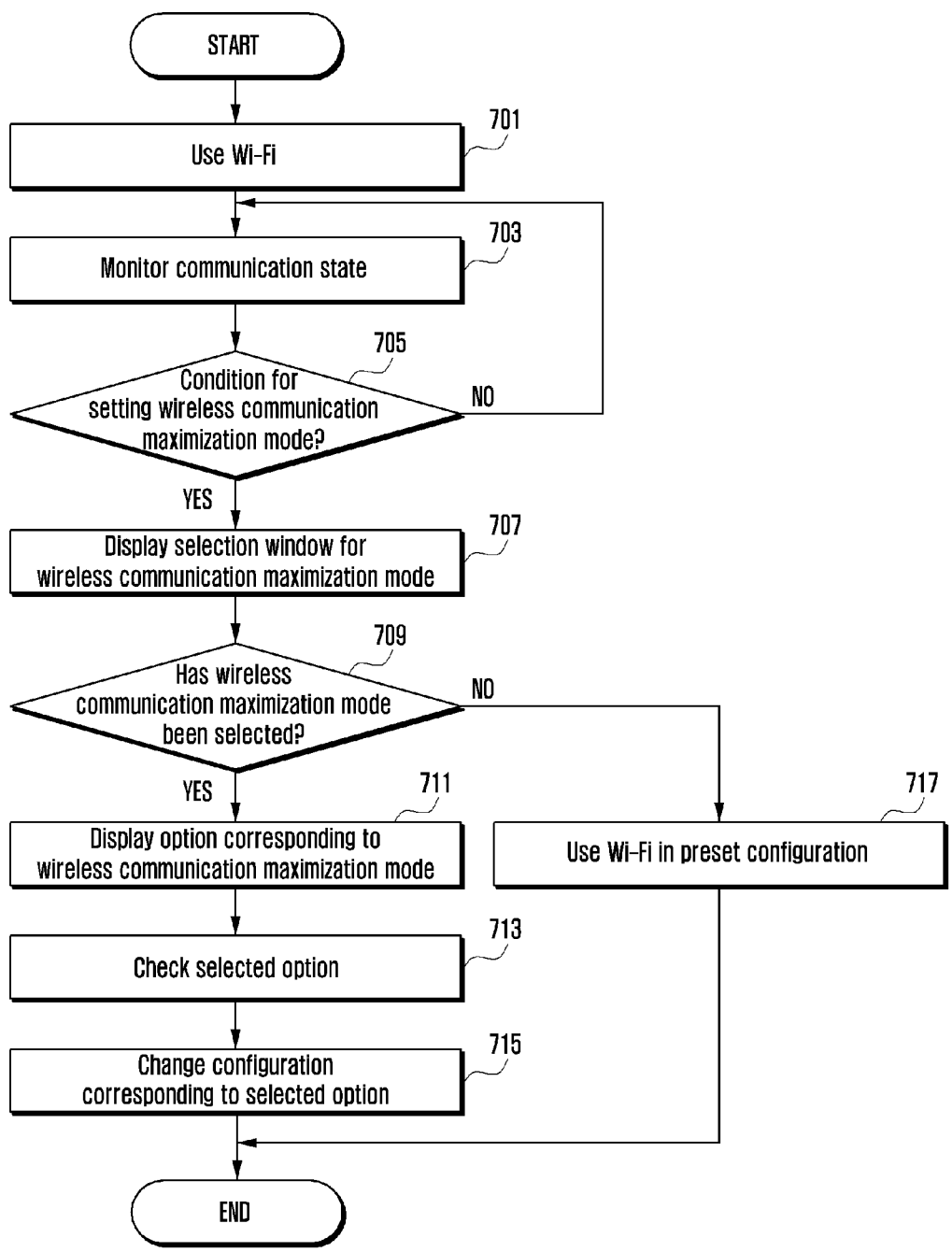
FIG. 7 is a flowchart for describing a method that automatically provides time to maximize wireless communication performance to a user and improves the wireless communication performance according to another embodiment of the present disclosure.

FIG. 7 is a flowchart for describing a method that automatically provides time to maximize wireless communication performance to a user and improves the wireless communication performance according to another embodiment of the present disclosure.

Referring to FIG. 7, in operation 701, the processor 210 of the electronic device 100 may be using Wi-Fi. Further, in operation 703, the processor 210 can monitor the state of wireless communication by the electronic device 100. The state of the wireless communication by the electronic device 100 can be determined on the basis of the speed of data transmission/reception by the electronic device 100 through the wireless communication unit 220. For example, the processor 210 can execute periodic or real-time measurement of the speed of data transmission/reception through wireless communication. In other words, monitoring the wireless communication state in operation 703 refers to executing periodic or real-time measurement of the speed of data transmission/reception. In operation 705, the processor 210 can determine whether the state of the wireless communication by the electronic device 100 corresponds to a condition for setting a wireless communication maximization mode. For example, when the speed of data transmission/reception is under 300 KBps/sec, the processor 210 can make the electronic device 100 enter the wireless communication maximization mode. In other words, the processor 210 can determine whether to automatically enter the wireless communication maximization mode on the basis of the measured speed of data transmission/reception. When, in operation 705, the state of the wireless communication by the electronic device 100 corresponds to a condition for setting the wireless communication maximization mode, the processor 210 can display, in operation 707, a selection window for the wireless communication maximization mode through the display unit 270. The selection window may be a message window for determining whether to enter the wireless communication maximization mode. Further, in operation 709, the processor 210 can detect the user's selection corresponding to the selection window for the wireless communication maximization mode. When, in operation 709, the user selects the selection window for the wireless communication maximization mode, the processor 210 can display an option corresponding to the wireless communication maximization mode in operation 711. Operations 711 to 715 may correspond to operations 605 to 609 of FIG. 6. That is, the options corresponding to the wireless communication maximization mode may be the same as the option corresponding to the wireless communication maximization mode specifically described in FIG. 6. In operation 713, the processor 210 can check an option selected by the user in response to the displayed option. In operation 715, the processor 210 can change the configuration of the electronic device in response of the option selected by the user.

Further, when, in operation 705, the state of the wireless communication by the electronic device 100 may not correspond to a condition for setting the wireless communication maximization mode, the processor 210 can return to operation 703 and continue to monitor the state of the wireless communication by the electronic device 100. In addition, when the user does not select the wireless communication maximization mode in operation 709, the processor 210 can use Wi-Fi while maintaining the current configuration as it is, in operation 717. In other words, although the speed of data transmission/reception is low owing to a decrease in the Wi-Fi reception rate, the electronic device 100 can maintain the use of Wi-Fi.

According to various embodiments of the present disclosure, the devices (e.g. modules or their functions) or methods may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various example embodiments of the present disclosure.

The module or programming module of the present disclosure may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

What is claimed is:

1. An electronic device comprising:
 a wireless communication unit that performs wireless communication;
 a display unit; and
 at least one processor, configured to:
 measure a speed of data transmission/reception by the wireless communication unit,
 determine whether to enter a wireless communication maximization mode based on the measured the speed of data transmission/reception,
 in response to detecting a request to enter the wireless communication maximization mode, display an option for configuring the wireless communication maximization mode on the display unit,
 detect a selection corresponding to the displayed option, and
 in response to detecting the selection, change a configuration of at least one component of the electronic device that reduces noise generated in a wireless communication frequency band.

2. The electronic device of claim 1, wherein the at least one processor is further configured to:
 detect an input requesting activation of the wireless communication maximization mode, and
 activate the wireless communication maximization mode in response to the input.

3. The electronic device of claim 1, wherein the at least one processor is further configured to:
 detect whether the measured speed of the data reception is under a preset threshold value, and
 when the speed of the data transmission/reception is under the preset threshold value, activate the wireless communication maximization mode.

4. The electronic device of claim 3, wherein the at least one processor is further configured to:
 control the display unit to display a pop-up window including a selectable option for activating the wireless communication maximization mode before entering the wireless communication maximization mode, and
 activating the wireless communication maximization mode in response to detecting selection of the option of the pop-up window.

5. The electronic device of claim 3,
 wherein the preset threshold value comprises a reference value utilized to determine whether to activate the wireless communication maximization mode.

6. The electronic device of claim 1,
 wherein the at least one processor is further configured to change the configuration of the at least one component, including at least one of:
 a clock-speed of a memory component,
 a type of an drive interface for a hard drive and/or solid state drive, and
 a version of a Universal Serial Bus interface.

7. A method for improving wireless communication performance in an electronic device, comprising:
 measuring a speed of data transmission/reception by a wireless communication unit,
 determining whether to enter a wireless communication maximization mode based on the measured the speed of data transmission/reception,
 in response to detecting a request to enter the wireless communication maximization mode, display an option for configuring the wireless communication maximization mode on a display unit,
 detect a selection corresponding to the displayed option, and
 in response to detecting the selection, changing a configuration of at least one component of the electronic device that reduces noise generated in a wireless communication frequency band.

8. The method of claim 7, wherein detecting the request for entering the wireless communication maximization mode further comprises:
 detecting an input requesting activation of the wireless communication maximization mode, and activating the wireless communication maximization mode in response to the input.

9. The method of claim 7, further comprising:
 determining whether the speed of the data transmission/reception is under a preset threshold value; and when the speed of the data transmission/reception is under the preset threshold value, activating the wireless communication maximization mode.

10. The method of claim 9, further comprising:
displaying a pop-up window including a selectable option for activating the wireless communication maximization mode before entering the wireless communication maximization mode; and
activating the wireless communication maximization mode in response to detecting selection of the option of the pop-up window.

11. The method of claim 9, wherein the preset threshold value comprises a reference value utilized to determine whether to activate the wireless communication maximization mode.

12. The method of claim 7, wherein the changed configuration of the at least one component comprises a change in at least one of:
 a clock-speed of a memory component,
 a type of drive interface for a hard drive or a solid state drive, and
 a version of a Universal Serial Bus interface.

13. A non-transitory computer-readable storage medium storing one or more programs comprising instructions which, when executed by an electronic device, cause the device to execute the method according to claim 7.

* * * * *